United States Patent [19]
Kooijman

[11] Patent Number: 5,136,192
[45] Date of Patent: Aug. 4, 1992

[54] HIGH SPEED MEASURING DEVICE UTILIZING LOGARITHMIC CONVERSION

[75] Inventor: Cornelis S. Kooijman, Eindhoven, Netherlands

[73] Assignee: U.S. Philips Corporation, New York, N.Y.

[21] Appl. No.: 582,296

[22] Filed: Sep. 13, 1990

[30] Foreign Application Priority Data

Sep. 29, 1989 [NL] Netherlands ............... 8902422

[51] Int. Cl.$^5$ ............................................. G06G 7/24
[52] U.S. Cl. .................................. 307/492; 250/214 L
[58] Field of Search ................. 307/492; 250/214 L; 356/223

[56] References Cited

U.S. PATENT DOCUMENTS

4,633,077 12/1986 Ikari et al. ................... 250/214 L

FOREIGN PATENT DOCUMENTS

0216163 8/1986 European Pat. Off. .

OTHER PUBLICATIONS

"Multi-Sensor-System fur Roboter" by G. Hirzinger and J. Dietrich Technisches Messen tm, 53, Jahrgang, Heft Jul. 8, 1986, pp. 286–292.
(ATM) Archiv fur technisches Messen-Blatt Z 6343-9 (Juli. 1973) 137 Elektronica 83/20, pp. 39–49.

*Primary Examiner*—David Mis
*Attorney, Agent, or Firm*—Bernard Franzblau

[57] ABSTRACT

A measuring device comprises a detector (1) for a quantity x to be measured, which detector is adapted to produce two signals $I_1$ and $I_2$ which relate to x as $x=(I_1-I_2)/(I_1+I_2)$. The device further comprises a processing circuit (3) which includes a first and a second logarithmic converter (9, 11) whose inputs receive input signals $V_1$ and $V_2$ which are proportional to the first and the second measuring signal $I_1$, $I_2$, respectively. The outputs of the logarithmic converters are connected to first and second inputs (12A, 12B) of a subtractor circuit (13) which produces at its output (14) an output signal U(x) which depends on the quantity x to be measured. If a subtractor circuit is used which is adapted to determine the hyperbolic tangent of the difference between the signals $\log V_1$ and $\log V_2$ present at its two inputs (12A, 12B), the relationship between u(x) and x will be linear.

5 Claims, 3 Drawing Sheets

HIGH SPEED MEASURING DEVICE UTILIZING LOGARITHMIC CONVERSION

BACKGROUND OF THE INVENTION

This invention relates to a measuring device comprising a detector for a quantity x to be measured, which detector is adapted to produce two measuring signals $I_1$ and $I_2$ which relate to the quantity x to be measured as $x=(I_1-I_2)/(I_1+I_2)$. The further comprises a processing circuit for converting the measuring signals $I_1$ and $I_2$ into an output signal U(x) whose value depends on the quantity x to be measured.

An example of such a device is disclosed in Technisches Messen tm, 53, No. 7/8, pp. 1986, 286–292. Reference is made especially to FIG. 6 and the associated description. In the cited example the detector is formed by a position-sensitive detector (PSD) which produces two currents $I_1$ and $I_2$ as the measuring signals. The processing circuit comprises a subtractor circuit and an adder circuit which supply signals proportional to the difference $I_1-I_2$ and the sum $I_1+I_2$, respectively, of the measuring signals. The outputs of these circuits are connected to the inputs of an analog divider which supplies an output signal proportional to $(I_1-I_2)/(I_1+I_2)$. It has been found that the cited processing circuit and similar processing circuits offer satisfactory results if the requirements imposed as regards speed and dynamic range of the measuring system are not particularly severe.

SUMMARY OF THE INVENTION

The invention aims to provide a measuring device of the kind set forth which can satisfy very severe requirements as regards speed and dynamic range. To achieve this, the device in accordance with the invention is characterized in that the processing circuit comprises a first and a second logarithmic converter whose inputs are suitable for receiving a first and a second input signal, respectively, which are proportional to the first measuring signal $I_1$ and the second measuring signal $I_2$, respectively The respective outputs of the converters are, connected to a first and a second input, respectively, of a subtractor circuit.

In the device in accordance with the invention, the logarithms of the measuring signals are formed directly (possibly after preparation such as by a current-voltage conversion) resulting in strongly reduced dynamics of these signals. The operation of the logarithmic converters is very fast and the comparatively slow combination of an adder circuit, a subtractor circuit and an analog divider can be dispensed with.

The subtractor circuit following the logarithmic converters supplies an output signal which is proportional to $\log((1+x)/(1-x))$ if no further steps are taken, x being the quantity to be measured. For comparatively small values of x (for example, $|x|<0.6$), approximately:

$$\log\frac{1+x}{1-x} = x$$

Therefore, this output signal can be readily used in many cases. In other cases, however, it may be desirable to have available an output signal which linearly depends on x also for large values of x. Such an output signal is supplied by a preferred embodiment of the device in accordance with the invention which is characterized in that the subtractor circuit is adapted to determine the hyperbolic tangent of the difference between the signals present on its first and its second input.

A further embodiment in which the hyperbolic tangent function is comparatively simply realised in the subtractor circuit is characterized in that the subtractor circuit comprises a first and a second bipolar transistor ($T_1$, $T_2$) which are connected in a differential amplifier configuration and whose base terminals are connected to the first and the second input, respectively, said transistors being thermally connected to a control circuit for keeping their temperature constant.

BRIEF DESCRIPTION OF THE DRAWINGS

These and other aspects of the invention will be described in detail hereinafter with reference to the accompanying drawing in which.

DESCRIPTION OF THE PREFERRED EMBODIMENTS

Figure 1:
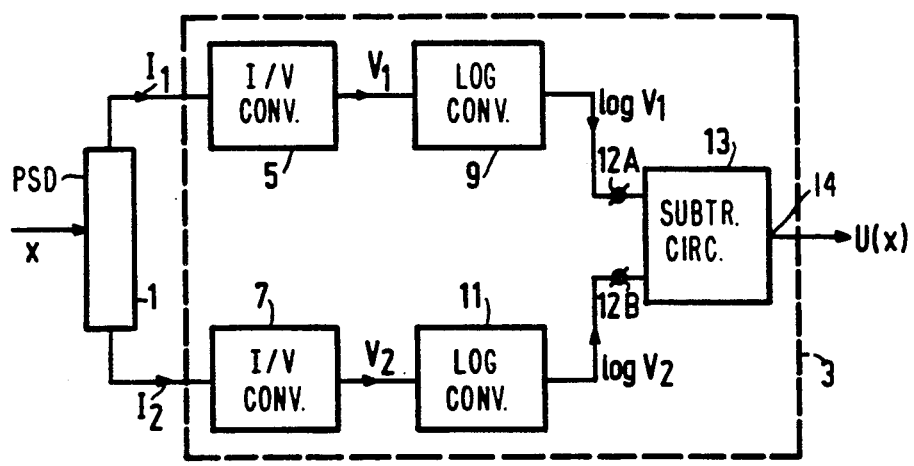
FIG. 1 shows a block diagram of an embodiment of a measuring device in accordance with the invention, FIG. 2 diagrammatically shows an embodiment of a detector which is suitable for use in the measuring device shown in FIG. 1.

The measuring device which is shown in the form of a block diagram in FIG. 1 comprises a detector 1 for a quantity x to be measured. The detector 1 may be, for example, a position sensitive detector as will be described in detail hereinafter with reference to FIG. 2. Other examples in this respect are a dual photocell (duocell) and an optical magnetic field detector as described in EP-A 0 216 163. The detector 1 produces two measuring signals $I_1$ and $I_2$ which relate to the quantity x to be measured in accordance with the formule:

$$x=(I_1-I_2)/(I_1+I_2) \tag{1}$$

In the case of a position sensitive detector, the measuring signals $I_1$ and $I_2$ are formed by electric currents. These measuring currents are applied to a processing circuit 3 for converting these currents into an output signal U(x) whose value depends on the quantity x to be measured.

The processing circuit 3 comprises a first current-voltage converter 5 which converts a first measuring current $I_1$ into a first measuring voltage $V_1$ and a second current voltage converter 7 which converts the second measuring current $I_2$ into a second measuring voltage $V_2$. The measuring voltages $V_1$ and $V_2$ are proportional to the currents $I_1$ and $I_2$ respectively. The measuring voltages $V_1$ and $V_2$ are applied to the inputs of a first logarithmic converter 9 and a second logarithmic converter 11, respectively, whose outputs supply voltages which are proportional to log $V_1$ and log $V_2$, respectively. These outputs are connected to the first input 12A and the second input 12B, respectively, of a subtractor circuit 13.

The subtractor circuit 13 may be a simple, known analog subtractor circuit which determines the difference between the two signals present at its inputs 12A and 12B. Because the measuring voltages $V_1$ and $V_2$ are proportional to the measuring currents $I_1$ and $I_2$, the output signal produced by the subtractor circuit 13 at its output 14 then equals:

$$U(x) = A\log \frac{I_1}{I_2} = A\log \frac{1+x}{1-x} \qquad (2)$$

The value of the output signal $U(x)$ thus logarithmically relates to the quantity x to be measured, A being a proportionality factor. This logarithmic relationship between $U(x)$ and x is acceptable for many applications. However, for other applications a linear relationship will be preferred. In such cases the signal $U(x)$ can be converted, using an arithmetic device (not shown) into a signal which linearly relates to x, for example, by means of a look-up table. However, the subtractor circuit 13 can alternatively be constructed so that the output signal $U(x)$ is proportional to the hypberbolic tangent of the difference between the signals log $V_1$ and log $V_2$ present at its two inputs. An example of such a subtractor circuit will be described in detail hereinafter with reference to FIG. 4. Because, generally speaking:

$$\tanh\left[\frac{1}{2}\ln\frac{1+y}{1-y}\right] = y \qquad (3)$$

the output signal $U(x)$ is in this case directly proportional to the quantity x to be measured.

Figure 2:
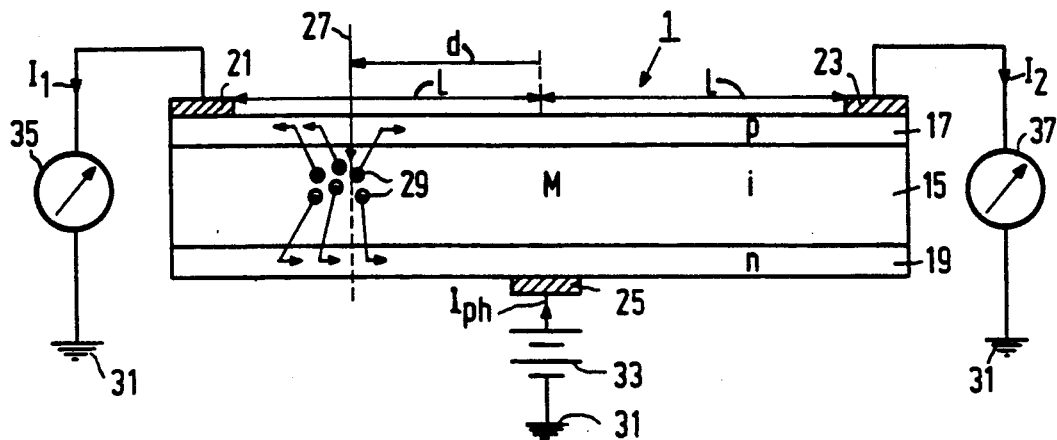

FIG. 2 diagrammatically shows a position sensitive detector (PSD) which can be used as a detector in the measuring circuit described with reference to FIG. 1. The PSD consists of a plate 15 of pure silicon which has a thickness of approximately 0.25 mm and on one side of which it is provided with a p-layer 17, an n-layer 19 being provided on the opposite side, resulting in a p-i-n structure. At the side of the p-layer the PSD is provided with two measuring contacts 21 and 23 in order to obtain a position-dependent signal. In the present embodiment, the n-layer is provided with a single power supply contact 25. Also known are PSDs comprising two or more contacts on one or on both sides. For example, see IEEE Journal of Solid-State Circuits, Vol. SC-13, No. 3, pp. 392-399. It is to be noted that the dimensions in the vertical direction are greatly exaggerated in FIG. 2.

When a light beam 27 is incident on a point between the two measuring contact 21 and 23 pairs of charge carriers 29 are generated, which charge carriers reach the measuring contacts 21, 23 and the power supply contact 25, respectively, via the p-layer and the n-layer. When a voltage source 33 of correct polarity is connected between the power supply contact 25 and a reference point 31 and the measuring contacts 21 and 23 are connected to the reference point 31 via ammeters 35 and 37, the charge carriers 29 generated cause a photocurrent $I_{ph}$ from the positive pole of the voltage source 33 to the power supply contact 25. This photocurrent is distributed between the measuring contact 21 and 23, so that the ammeters 35 and 37 measure measuring currents $I_1$ and $I_2$, respectively, for which $I_1+I_2=I_{ph}$. The value of the measuring currents $I_1$ and $I_2$ depends on the location in which the light beam 27 is incident on the layer 17. The measuring contacts 21 and 23 are situated at a distance L from the center M of the PSD and the light beam 27 is incident on the layer 17 at a distance d from the center, where d may vary from +L (the light beam is incident on the PSD near the left hand measuring contact 21) to −L (the light beam is incident on the PSD near the right hand measuring contact 23). The measuring currents $I_1$ and $I_2$ then equal $$I_1 = I_{ph}(1+d/L)/2 \qquad (4)$$

$$I_2 = I_{ph}(1-d/L)/2 \qquad (5)$$

The equation (1), where $d/L=x$, is obtained by dividing the difference of the equations (4) and (5) by their sum.

It follows from the foregoing that the operation of the PSD is analogous to that of a potentiometer whose wiper is connected to a current source while its fixed contacts are connected to a reference point. The position of the wiper can be rendered dependent on a quantity to be measured (for example, a pressure or a temperature) and the potentiometer can be inserted as the detector 1 in the measuring device shown in the Figure. The PSD can similarly be used as a detector, for example, in a distance meter as described in the cited article in Technisches Messen tm, 53, No. 1.

Figure 3:
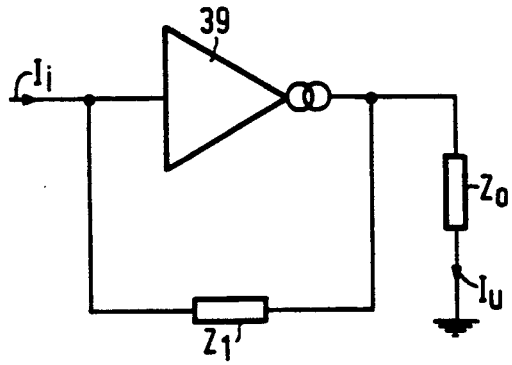
FIG. 3 shows a circuit diagram of an embodiment of a current-voltage converter.

When, as in the case of a PSD, the measuring signals $I_1$ and $I_2$ are measuring currents, it is generally desirable to convert these signals into measuring voltages $V_1$ and $V_2$ prior to further processing. For this purpose use is made of the current-voltage converters 5 and 7 which may consist, for example, of an operational amplifier with feedback, the measuring current being applied to the inverting input (see, for example ATM, Blatt Z 6343-9 (July 1973), page 137, FIG. 1). A drawback of this solution consists in that, due to the parasitic capacitance of the feedback resistance (which is chosen to be large for considerations of noise), the bandwidth is limited to a few MHz. Therefore, use is preferably made of a low-noise current amplifier, for example as described in Electronica 83/20 (Oct. 21, 1983), pp. 39-49. The principle of the circuit is shown in FIG. 3. When the gain of the amplifier 39 is infinitely high and when $Z_1 >> Z_0$, $I_u = Z_1/Z_0 \cdot I_i$. When $I_u$ is guided through a suitable resistance, a voltage is obtained which is proportional to $I_u$ and hence to $I_i$.

Figure 4:
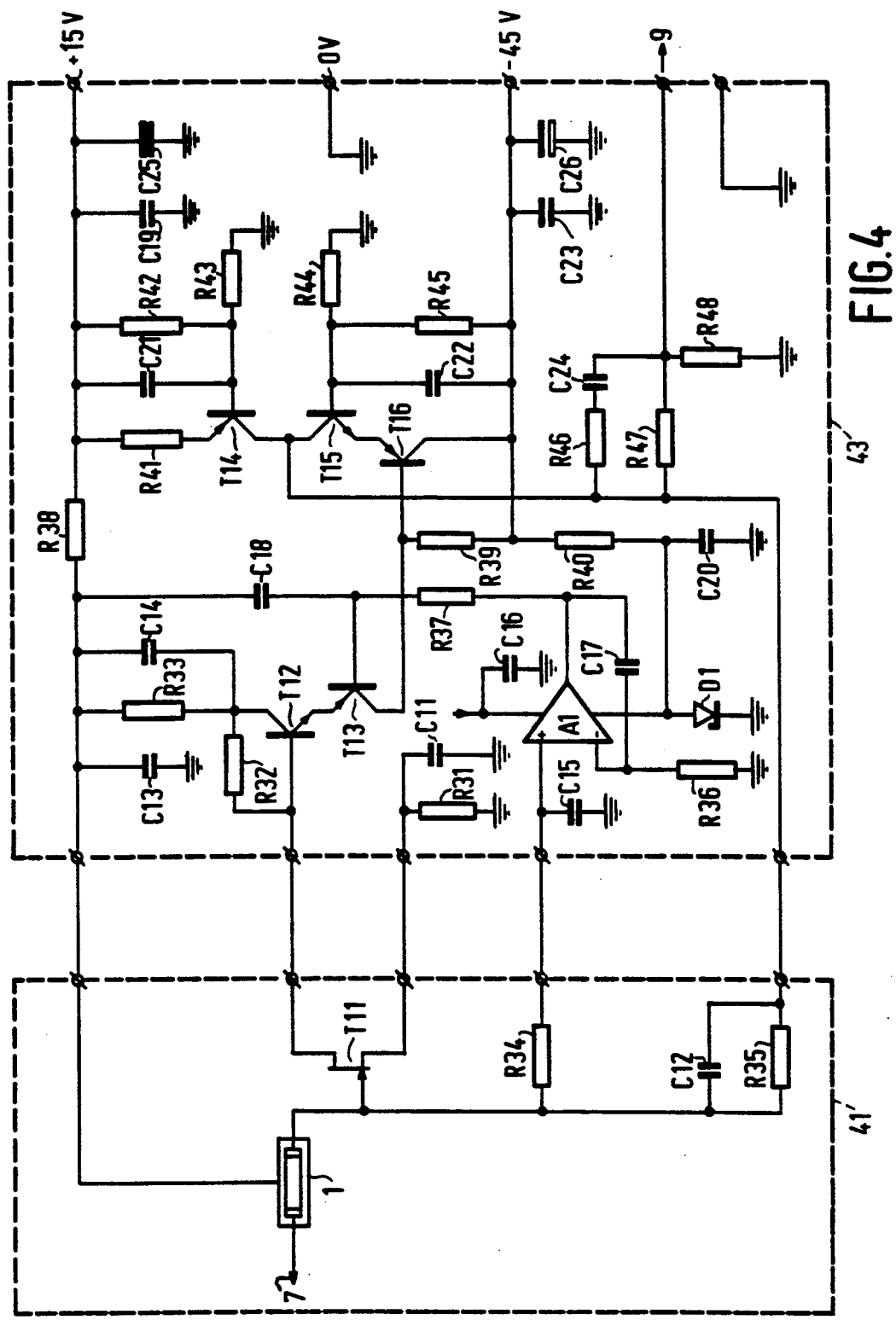
FIG. 4 shows a complete diagram of a current-voltage converter constructed using the principle shown in FIG. 3.

FIG. 4 shows a complete diagram of an embodiment of the first current voltage converter 5 which is constructed in accordance with the principle shown in FIG. 3. $Z_1$ is the parallel connection of $R_{35}$, $C_{12}$ and the parasitic capacitance of $R_{35}$ which amounts to approximately 0.2 pF. $Z_0$ is the network consisting of $R_{46}$, $R_{47}$, $R_{48}$ and $C_{24}$, $R_{46}$ and $R_{48}$ being small with respect to $R_{47}$ so that $Z_0$ is determined mainly by $R_{47}$ and $C_{24}$. It appears from the cited article in Electronica that the current amplification of the circuit is substantially independent of the frequency when the ratio $Z_1/Z_0$ is a real number (in the circuit in accordance with FIG. 3). This is the case when the RC products of these two impedances are equal. In the circuit shown in FIG. 4 $R_{35}$ equals 100 kΩ and $C_2$ equals 1 pF, so that the RC product of $Z_1$ (taking into account the parasitic capacitance of 0.2 pF) equals $1.2 \times 10^{-7}$. $R_{47}$ equals 1 kΩ and $C_{24}$ equals 120 pF, so the the RC product of $Z_0$ also equals $1.2 \times 10^{-7}$. The ratio $Z_1/Z_0$ then equals $C_{24}/(C_2+0.2 \text{ pF}) = 100$.

The values and the type numbers of the components used in a practical embodiment of the circuit shown in FIG. 4 are:

| | | | | |
|---|---|---|---|---|
| $R_{31}$: | 22 | Ω | $C_{11}$: | 220 nF |
| $R_{32}$: | 270 | Ω | $C_{12}$: | 1 pF |
| $R_{33}$: | 100 | Ω | $C_{13}$: | 220 nF |
| $R_{34}$: | 1 | MΩ | $C_{14}$: | 25 pF |
| $R_{35}$: | 100 | kΩ | $C_{15}$: | 10 nF |
| $R_{36}$: | 1 | MΩ | $C_{16}$: | 100 nF |
| $R_{37}$: | 4.7 | kΩ | $C_{17}$: | 10 nF |
| $R_{38}$: | 75 | Ω | $C_{18}$: | 33 nF |
| $R_{39}$: | 1 | kΩ | $C_{19}$: | 100 nF |
| $R_{40}$: | 33 | kΩ | $C_{20}$: | 100 nF |
| $R_{41}$: | 470 | Ω | $C_{21}$: | 220 nF |
| $R_{42}$: | 2.7 | kΩ | $C_{22}$: | 220 nF |
| $R_{43}$: | 4.7 | kΩ | $C_{23}$: | 100 nF |
| $R_{44}$: | 10 | kΩ | $C_{24}$: | 120 pF |
| $R_{45}$: | 820 | Ω | $C_{25}, C_{26}$: | 2.2 μF |
| $R_{46}$: | 33 | Ω | $T_{11}$: | SST 4416 |
| $R_{47}$: | 1 | kΩ | $T_{12}$: | BF 840 |
| $R_{48}$: | 51 | Ω | $T_{13}$: | BF 550 |
| $D_1$: | BZX 79C15 | | $T_{14}, T_{16}$: | BC 856 |
| $A_1$: | AD 548 | | $T_{15}$: | BC 846 |

The detector 1 is accommodated, together with $T_{11}$, $R_{34}$, $C_{12}$, $R_{35}$ and corresponding components of the second current/voltage converter 7 (not shown), on a first printed circuit board 41, the further components of the first current/voltage converter 5 being accommodated on a second board 43. For the second current-/voltage converter 7 there is provided a second board (not shown) which corresponds to the board 43. The output current $I_u$ of the circuit (see FIG. 3) is converted, by way of the resistance $R_{48}$, into an output voltage which is applied to the first logarithmic convereter 9.

In this configuration the noise level amounts to 8 nA in a bandwidth of 20 MHz. The maximum input current I equals 800 μA, so that the total dynamic range equals 100 dB.

Each of the logarithmic amplifiers 9 and 11 may consist of a known circuit whose principal component is formed by a logarithmic amplifier (for example, of the type AD 640 manufactured by Analog Devices) or a cascade connection of two of such amplifiers.

Figure 5:
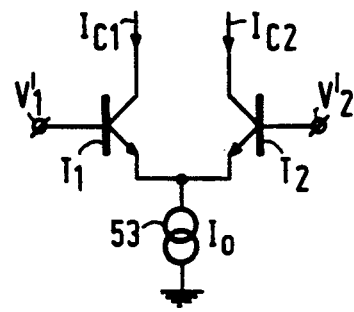
FIG. 5 shows a diagram illustrating the principle of an embodiment of a subtractor circuit.

FIG. 5 shows a diagram illustrating the construction principle of a circuit which is suitable for use in the subtractor circuit 13 in order to make this subtractor circuit suitable for determining the hyperbolic tangent of the difference between the signals present on its first and second inputs 12A and 12B, respectively. The circuit comprises two identical bipolar transistors $T_1$ and $T_2$ which are connected in a differential amplifier configuration. The transistors $T_1$ and $T_2$ are maintained at the same constant temperature. The base terminals receive voltages $V'_1$ and $V'_2$, respectively, which are proportional to the logarithms of the measuring voltages $V_1$ and $V_2$, respectively. The emitter terminals are connected together to a current source 53 providing a current $I_o$. The operation is as follows:

Generally speaking, for a biopolar transistor:

$$I_c = i_s \left( \exp\left( \frac{qV_{BE}}{kT} \right) - 1 \right) \quad (6)$$

Therein:
$I_c$: is the collector current
$i_s$: is a leakage current proportional to the emitter surface,
q: is the unity charge
k: is Boltzmann's constant
T: is the absolute temperature
$V_{BE}$: is the base-emitter voltage.

Because $i_s$ and T are the same for both transistors $T_1$ and $T_2$ and because $$\exp\left( \frac{qV_{BE}}{kT} \right) >> 1, \text{ it follows from (6) that:}$$

$$\frac{I_{c1}}{I_{c1}} = \exp\left\{ \frac{q}{kT} (V_{BE1} - V_{BE2}) \right\} = \quad (7)$$

$$\exp\left\{ \frac{q}{kT} (V_1 - V_2) \right\}$$

Therein, the suffixes 1 and 2 refer to the transistors $T_1$ and $T_2$, respectively. Because, further, $I_O = I_{c1} + I_{c2}$, it follows from (7) that:

$$\frac{I_{c1} - I_{c2}}{I_0} = \frac{\exp\left\{ \frac{q}{kT} (V_1 - V_2) \right\} - 1}{\exp\left\{ \frac{q}{kT} (V_1 - V_2) \right\} + 1} =$$

$$\tanh\left( \frac{q}{kT} (V_1 - V_2) \right)$$

Therefore $$I_{c1} - I_{c2} = I_0 \cdot \tanh\left( \frac{q}{kT} (V_1 - V_2) \right) \quad (8)$$

It is follows from (8) and (3) that the collector difference current difference $I_{c1}-I_{c2}$ in the circuit shown in FIG. 4 is proportional to the quantity x to be measured.

Figure 6:
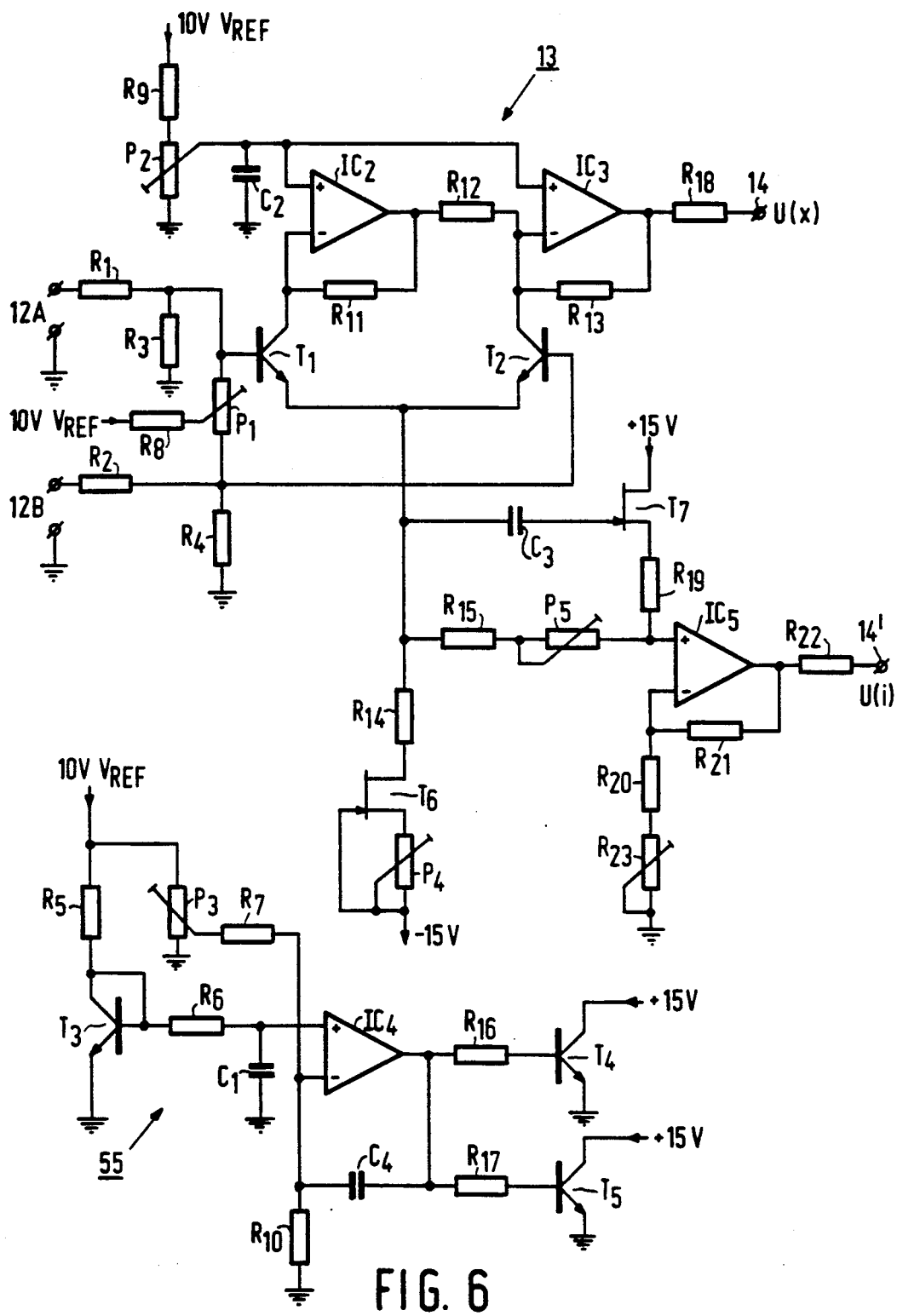
FIG. 6 shows a complete diagram of a subtractor circuit constructed on the basis of the principle shown in FIG. 5.

FIG. 6 shows a complete diagram of an embodiment of an embodiment of the subtractor circuit utilising the principle shown in FIG. 5. The transistors, connected in a differential amplifier configuration, are again denoted by the references $T_1$ and $T_2$ in FIG. 6. The first input 12A is connected to the output of the first logarithmic converter 9 and the second input 12B is connected to the output of the second logarithmic converter 11. The collector difference current of the transistors $T_1$ and $T_2$ is converted, using the operational amplifiers denoted by the reference IC2 and IC3, into an output voltage u(x) which varies between 0 and 2 V and which is proportional to the quantity x to be measured. The emitter voltage of the transistors $T_1$ and $T_2$ is proportional to the logarithm of the sum of the measuring signals $I_1$ and $I_2$, and hence to $I_{ph}$, if the detector 1 is a PSD as described with reference to FIG. 2. This emitter voltage is amplified by means of the operational amplifier IC5 and is available, via a second output 14' of the subtractor circuit 13, as a second output voltage u(i).

The temperature of the described subtractor circuit 13 is maintained at a constant value (approximately 50° C.) by a control circuit 55 which is thermally connected to the subtractor circuit. This control circuit comprises a transistor $T_3$ which acts as a temperature sensor and whose output signal is amplified by the operational amplifier IC4 which controls the transistors T4 and T5 which act as heating elements. The control circuit 55 is preferably accommodated in an envelope together with the subtractor circuit. The values and type numbers of the components used in a practical embodiment of the circuit shown in FIG. 6 are:

| | | | | |
|---|---|---|---|---|
| $R_1, R_2$: | 33 | Ω | $T_1$ to $T_5$: | CA 3127 |
| $R_3, R_4$: | 16.2 | Ω | $T_6, T_7$: | BF 256A |
| $R_5, R_6$: | 100 | kΩ | | |
| $R_7$: | 1 | MΩ | | |
| $R_8$: | 10 | kΩ | | |
| $R_9$: | 7.5 | kΩ | | |
| $R_{10}$: | 100 | kΩ | | |
| $R_{11}$ to $R_{14}$: | 1 | kΩ | | |
| $R_{15}$: | 470 | kΩ | | |
| $R_{16}, R_{17}$: | 1 | kΩ | | |
| $R_{18}$: | 50 | Ω | | |
| $R_{19}$: | 3 | kΩ | | |
| $R_{20}$: | 100 | Ω | | |
| $R_{21}$: | 1 | kΩ | | |
| $R_{22}$: | 50 | Ω | | |
| $P_1$: | 5 | kΩ | | |
| $P_2$: | 2 | kΩ | | |
| $P_3$: | 100 | kΩ | | |
| $P_4$: | 5 | kΩ | | |
| $P_5$: | 500 | Ω | | |
| $C_1$: | 10 | nF | | |
| $C_2$: | 1 | nF | | |
| $C_3$: | 22 | nF | | |
| $C_4$: | 2.2 | nF | | |

I claim:

1. A measuring device comprising; a detector for detecting a quantity x to be measured and which is adapted to produce first and second measuring signals $I_1$ and $I_2$ which relate to the quantity x to be measured as $x=(I_1+I_2)/(I_1+I_2)$, and a processing circuit for converting the measuring signals $I_1$ and $I_2$ into an output signal $U(x)$ whose value depends on the quantity x to be measured, characterized in that the processing circuit comprises, a first and a second logarithmic converter having inputs for receiving a first and a second input signal, respectively, which are proportional to the first measuring signal $I_1$ and the second measuring signal $I_2$, respectively, means for coupling outputs of the first and second logarithmic converters to a first and a second input, respectively, of a subtractor circuit, and an output terminal coupled to an output of the subtractor circuit to produce said output signal $U(x)$.

2. A measuring device as claimed in claim 1 wherein said first and said second measuring signals $I_1$ and $I_2$ are current signals, said processing circuit further comprising first and second current/voltage (I/V) converters which have respective inputs that receive said first and second current signals $I_1$ and $I_2$ and have respective outputs coupled to respective inputs of the first and second logarithmic converters to supply thereto respective first and second voltage signals determined by said first and second current signals $I_1$ and $I_2$, respectively.

3. A measuring device comprising:
a detector for detecting a quantity x to be measured and which is adapted to produce first and second measuring signals $I_1$ and $I_2$ which relate to the quantity to be measured as $x=(I_1-I_2)/(I_1+I_2)$, and
a processing circuit for converting the measuring signals $I_1$ and $I_2$ into an output signal $U(x)$ whose value depends on the quantity x to be measured, wherein said processing circuit comprises;
a first and a second logarithmic converter having inputs for receiving a first and a second input signal, respectively, which are proportional to the first measuring signal $I_1$ and the second measuring signal $I_2$, respectively, and means for coupling outputs of the first and second logarithmic converters to a first and second input, respectively, of a subtractor circuit which is adapted to determine the hyperbolic tangent of the difference between the signals present at its first and its second input.

4. A measuring device as claimed in claim 3 wherein the subtractor circuit comprises a first and a second bipolar transistor which are connected in a differential amplifier configuration and whose base terminals are connected to the first and the second input, respectively, of the subtractor circuit, said transistors being thermally coupled to a control circuit for keeping their temperature constant.

5. A measuring device as claimed in claim 4 wherein respective emitters of the first and second bipolar transistors are connected in common to a source of reference potential via a current source and the collector difference current ($I_{c1}-I_{C2}$) is proportional to the quantity x to be measured, where $I_{C1}$ and $I_{C2}$ are the collector currents of the first and second bipolar transistors, respectively.

* * * * *

UNITED STATES PATENT AND TRADEMARK OFFICE
CERTIFICATE OF CORRECTION

PATENT NO. : 5,136,192
DATED : August 4, 1992
INVENTOR(S) : Cornelis S. Kooijman It is certified that error appears in the above-indentified patent and that said Letters Patent is hereby corrected as shown below:

Claim 1, column 7, line 35, change "$I_1+I_2$" (first occurrence) to --$I_1-I_2$--.

Signed and Sealed this

First Day of February, 1994

*Attest:*

BRUCE LEHMAN

*Attesting Officer*     *Commissioner of Patents and Trademarks*